United States Patent [19]

Schrag et al.

[11] 4,044,906
[45] Aug. 30, 1977

[54] MULTIPLE ROUND BALE MOVER

[75] Inventors: Thomas Gene Schrag; Merle Keith Burkhart; Harold Keith Garrison, all of Newton, Kans.

[73] Assignee: Hesston Corporation, Hesston, Kans.

[21] Appl. No.: 603,359

[22] Filed: Aug. 11, 1975

[51] Int. Cl.² .............................................. B60P 1/16
[52] U.S. Cl. .................................. 214/506; 198/318; 214/83.26; 280/463
[58] Field of Search ............... 214/506, 501, 505, 508, 214/509, 83.26; 198/7 R, 7 BL, 13, 11, 119, 120.5, 121, 318; 280/472, 473, 468, 467, 463, 462

[56] References Cited

U.S. PATENT DOCUMENTS

| | | | |
|---|---|---|---|
| 2,169,661 | 8/1939 | Ratcliffe | 214/505 X |
| 2,419,824 | 4/1947 | Davis | 214/509 |
| 2,427,324 | 9/1947 | Farr et al. | 198/7 BL |
| 2,593,023 | 4/1952 | Haase | 198/121 X |
| 3,127,973 | 4/1964 | Scott | 198/7 BL |
| 3,297,142 | 1/1967 | Edwards | 198/7 BL |
| 3,952,895 | 4/1976 | Campbell | 214/506 |

Primary Examiner—Trygve M. Blix
Assistant Examiner—Sherman D. Basinger
Attorney, Agent, or Firm—Schmidt, Johnson, Hovey & Williams

[57] ABSTRACT

Large round bales are gathered in the field with a towable implement having a long bed that may be tipped forwardly or rearwardly to the ground about an intermediate transverse axis in order to accomplish front or rear loading of the implement. Bales are successively loaded by driving laterally spaced beams of the inclined bed under the bales as conveyor chains on the beams draw the bales in the opposite direction up onto the beams, whereupon the bed is leveled out for transporting the picked up bales. Unloading is accomplished by inclining the bed appropriately and driving the bales off the beams with the conveying chains as the beams are simultaneously drawn out from under the bales. The bed may be disposed either directly behind its towing vehicle or off to one side thereof by virtue of a hydraulically controlled, articulated tongue, and bale loading and unloading is facilitated by virtue of the absence of any interfering drive shafts across the beams at their opposite ends.

18 Claims, 12 Drawing Figures

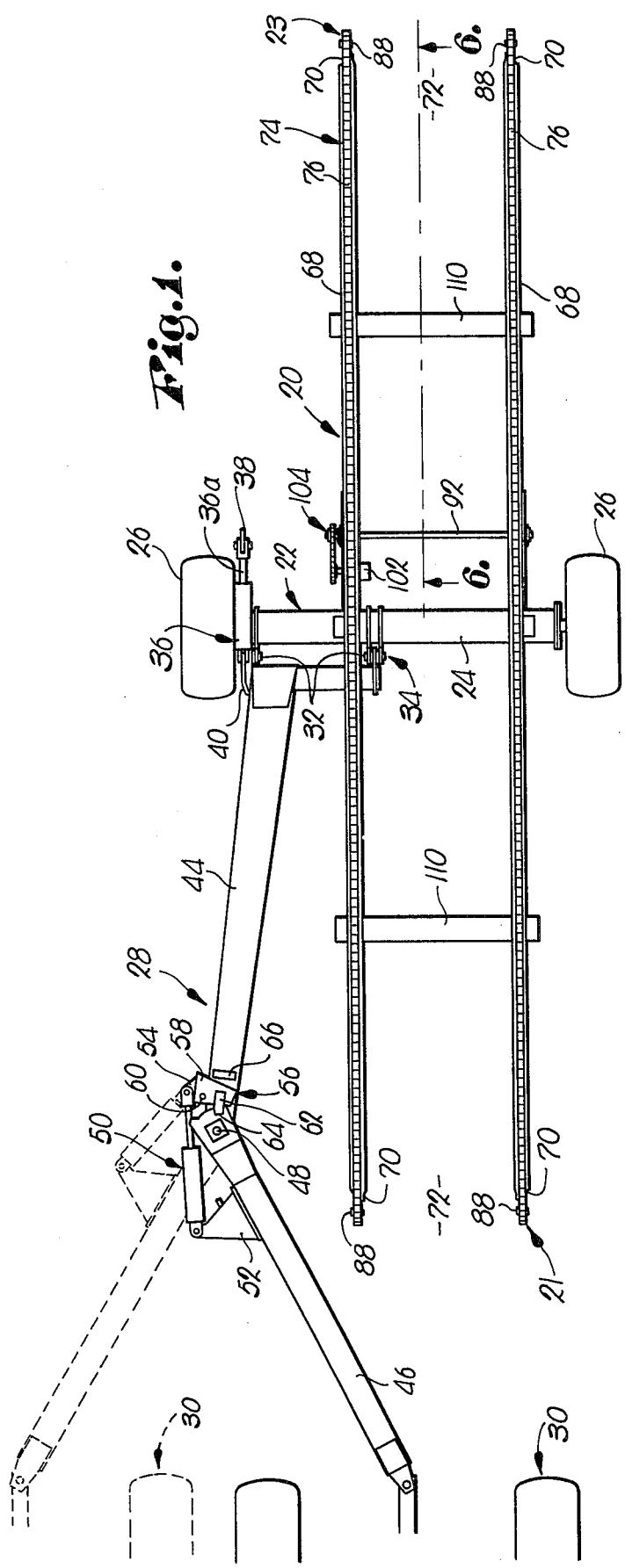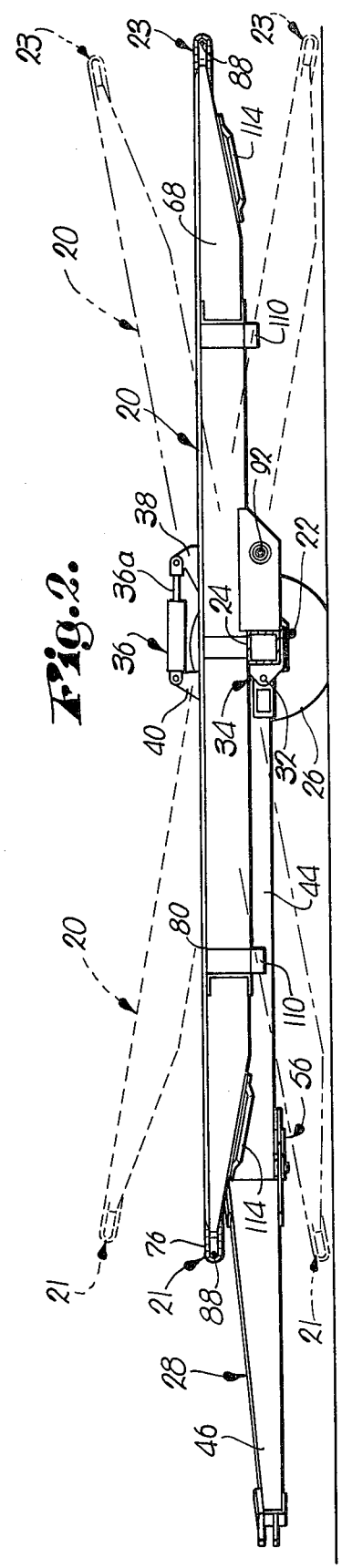

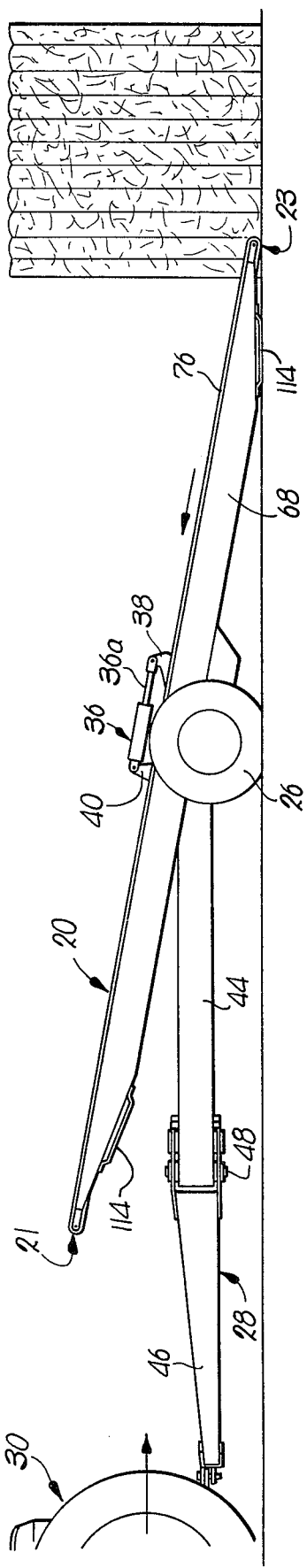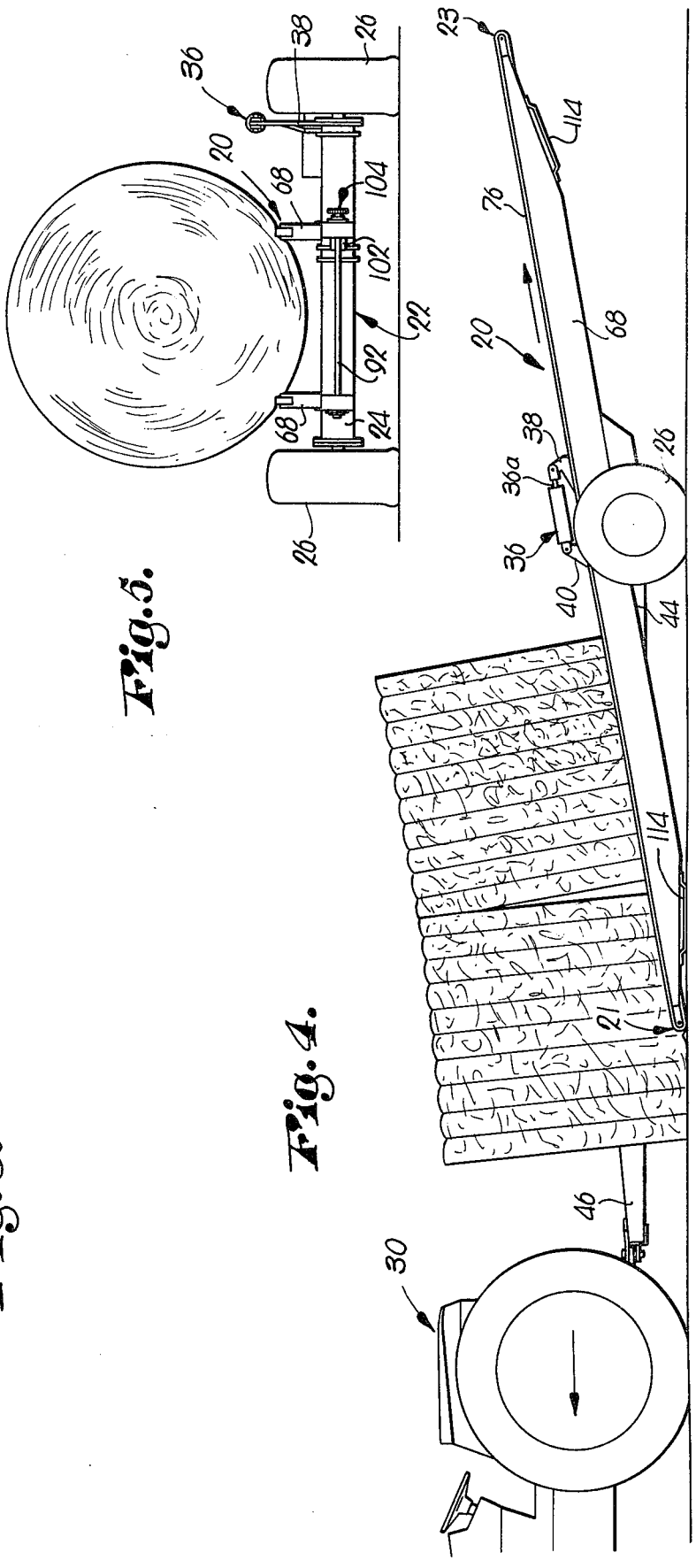
Fig. 3.
Fig. 5.
Fig. 4.

4,044,906

MULTIPLE ROUND BALE MOVER

This invention relates to a machine which permits one man to pick up, transport and unload several large round bales at the same time, each of which may typically weigh 1,000 to 2,000 pounds. While such bales are not truly round, but rather are cylindrical and round only in cross section, that terminology has been adopted by the industry and accordingly will be followed herein.

It is not new per se to pick up, transport and unload masses of animal foodstuffs utilizing inclinable beds provided with conveying chains to facilitate movement of the crop mass onto and off of the bed when tilted, such being shown, for example, in U.S. Pat. No. 3,209,932, to B. A. Schiltz, and U.S. Pat. No. 3,298,550, to B. D. Schiltz, each of which relates to moving equipment for compressed stacks of hay. Further, it is well-known in the bale handling art to elevate bales up an inclined ramp and onto a stacking bed as the bed is advanced across the field, the stacked bales subsequently being unloaded from the bed in any one of a number of ways.

Be that as it may, none of these arrangements is particularly conducive to the handling of large round bales and, accordingly, it is an important object of the present invention to provide a transporting implement which departs from prior teachings in such pertinent respects as to render the implement especially suited for rapid, efficient and trouble-free one-man transport of large round bales.

In accordance with the foregoing, it is another important object of the present invention to provide a transporting implement which permits the operator to load and unload from either the front or rear ends of the implement, depending upon his personal preference and/or the orientation and location of the bales to be transported. In this regard, it is not unusual for the operator to be confronted with a bale which is situated close to a fence, ditch or the like, making it virtually impossible, and in many instances extremely hazardous, to attempt to load the bale at the front of the implement, since its towing vehicle would have to be moved through the fence or into the ditch if front pickup were to be effected. In such instances, then, rear pickup becomes extremely desirable.

A further important object of this invention is to retain the concept disclosed in the aforementioned Schiltz patents of a transporting bed which utilizes laterally spaced, fore-and-aft extending beams, each provided with its own individual conveying chain along the full length thereof, while restructuring the drive for such chains in such a way as to render the bed open and unobstructed between the beams at both ends of the bed, thereby facilitating pickup and unloading at either end of the bed.

An additional important object of this invention is the provision of an articulated, hydraulically controlled tongue on the implement which enables the latter to be trailed directly behind a towing vehicle during movement through gates and the like while displaced laterally to one side of the vehicle during pickup and unloading.

A still further important object of this invention is to provide for tilting of the bed about a relatively low transverse axis such that the angle of inclination thereof during pickup is reduced sufficiently to minimize resistance to movement of bales up the inclined bed.

Yet another important object of this invention is to streamline the tips of the bale-supporting beams, which make initial contact with a bale during pickup, in such a manner as to minimize any tendency for such tips to snag twine or other binding medium wrapped about the bales.

In the drawings:

FIG. 1 is a top plan view of an implement constructed in accordance with the principles of the present invention, the implement being shown attached to a towing vehicle directly behind the latter and broken lines indicating the offset position of the implement during pickup and unloading;

FIG. 2 is a side elevational view of the implement with one wheel removed, broken lines indicating the manner in which its bed may be tilted downwardly at the front and rear for pickup and unloading at either end;

FIG. 3 is a schematic elevational view of the implement and its towing vehicle illustrating the manner in which a bale is loaded from the rear of the implement;

FIG. 4 is a schematic elevational view similar to FIG. 3, but illustrating the manner in which bales are loaded at the front of the implement;

FIG. 5 is a rear elevational view of the implement showing the manner in which bales are carried on the implement during transport;

Figure 6:
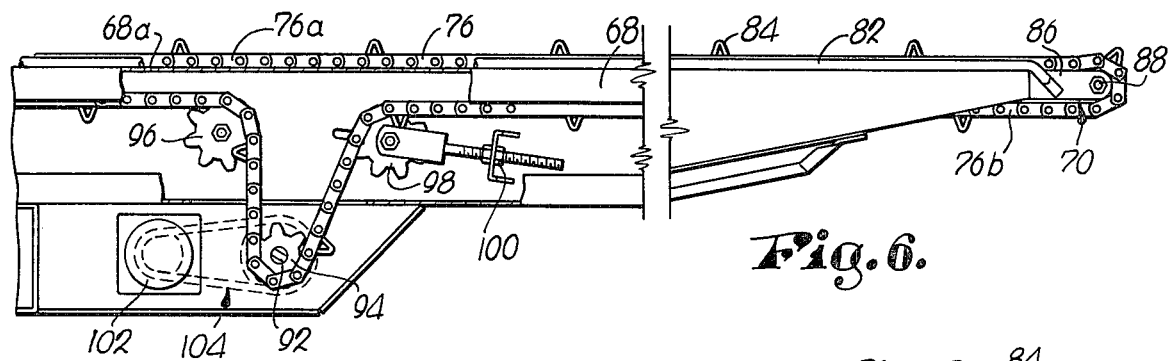
FIG. 6 is an enlarged, fragmentary cross-sectional view of the rear end of the implement taken substantially along line 6—6 of FIG. 1 and illustrating one drive arrangement for the conveying chain of the implement.

The implement has a normally horizontal bed 20 supported intermediate its front and rear ends 21 and 23 for movement across a field by a wheel and axle unit 22 which includes a tubular box beam 24 spanning bed 20 beneath the latter, and a pair of ground wheels 26 rotatably carried at opposite ends of box beam 24. Bed 20 is rigidly attached to box beam 24 so as to preclude relative movement between those two components although, of course, wheels 26 can rotate relative to bed 20.

Figure 12:
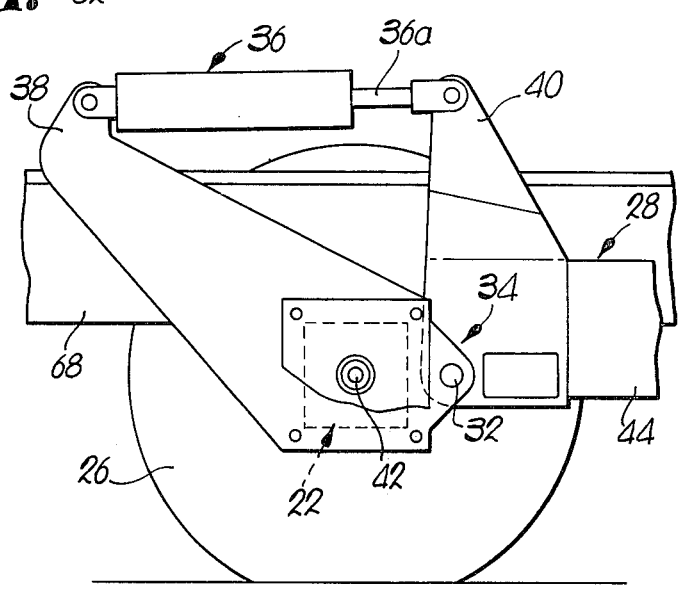
FIG. 12 is an enlarged, fragmentary elevational view of the wheel and axle unit of the implement with one wheel removed illustrating the low axis of tilting movement for the bed of the implement.

Tonque 28 extends forwardly from wheel and axle unit 22 along one side of bed 20 for attaching the implement to a towing vehicle and, a pair of coaxial, horizontal pivots 32 pivotally connect tongue 28 to box beam 24 slightly forwardly of the axes of rotation of wheels 26 to define an eccentrically disposed joint 34 between tongue 28 and wheel and axle unit 22. The joint 34 may be buckled and unbuckled vertically by a double-acting, fluid pressure piston and cylinder assembly 36 which extends between upstanding cranks 38 and 40 on box beam 24 and tongue 28 respectively, such buckling action causing the pivots 32 to raise and lower to thereby tilt bed 20 between the opposite extreme positions illustrated in broken lines in FIG. 2 and in solid lines in FIGS. 3 and 4. The arrangement between piston and cylinder assembly 36 and cranks 38, 40 is such that when the ram 36a of assembly 36 is fully extended, bed 20 is tilted downwardly and rearwardly about a transverse axis 42 (FIG. 12) that coincides with the axes of wheels 26, while when the ram 36a is fully retracted the bed 20 is tilted downwardly and forwardly about axis 42, and when ram 36a is intermediate its two limits, the bed 20 is held substantially level.

The tongue 28 is articulated, having a rearmost stationary section 44 which makes the pivotal connection with the box beam 24, and a forwardmost swingable section 46 which makes the hitching connection to vehicle 30. Swingable section 46 is coupled at its rearmost end with the forwardmost end of stationary section 44 for lateral swinging movement relative to bed 20 about a vertical pivot 48. A double-acting, fluid pressure piston and cylinder assembly 50 is connected between outwardly projecting lugs 52 and 54 on sections 46 and 44 respectively whereby to control swinging of section 46 between its alternate positions illustrated in FIG. 1. Thus, when section 46 is swung to the left relative to section 44 as illustrated in solid lines in FIG. 1, the bed 20 may be aligned directly behind vehicle 30, while when the section 46 is swung to the right relative to section 44, as shown in broken lines in FIG. 1, the bed 20 may be offset to the left side of vehicle 30.

The assembly 50 is capable of holding bed 20 directly behind vehicle 30 if desired, but preferably, an auxiliary lock 56 is provided between sections 44, 46 for serving this purpose in lieu of assembly 50. To this end, lock 56 includes a plate 58 swingable on section 44 about a pivot 60, the plate 58 carrying lug 54 to which assembly 50 is connected. A projection 62 on plate 58 extends forwardly therefrom and is receivable within a mating notch 64 in the rearmost end of section 46 when the latter is in its position as illustrated in solid lines in FIG. 1. When piston and cylinder assembly 50 is retracted from its condition illustrated in solid lines in FIG. 1, plate 58 is rotated counterclockwise about pivot 60 until engaging a stop 66 to withdraw projection 62 from notch 64, and subsequent further retraction of assembly 50 then causes the section 46 to move toward its broken line position illustrated in FIG. 1.

Lock 56 may take a number of different forms and the one illustrated herein is done by way of example only. If desired, lock 56 may simply take the form of a suitable flow control valve (not shown) inserted in the hydraulic circuit for assembly 50. The selected valve should open under pressure from a fluid source (not shown) in order to actuate assembly 50, but should close upon the removal of such pressure to trap fluid within assembly 50 thereby effectively locking the section 46 in its selected position.

Bed 20 includes a pair of laterally spaced, relatively narrow beams 68 that extend longitudinally between ends 21 and 23 of bed 20, and beams 68 are provided with outermost tips 70 at opposite extremes thereof which are disconnected across both ends 21, 23 of bed 20 to define unobstructed, open mouths 72 between tips 70. Beams 68 are spaced apart a distance somewhat less than the diameter of round bales to be moved such that they will engage and support the bales in the manner illustrated schematically in FIG. 5 when such bales are disposed endwise along bed 20.

Figure 11:
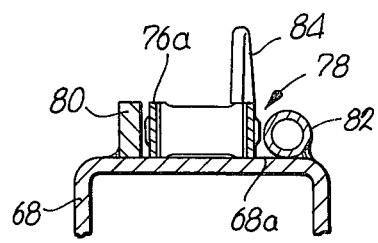
FIG. 11 is a fragmentary cross-sectional view of the beam shown in FIG. 10.

A conveyor broadly denoted by the numeral 74, extends lengthwise along the bed 20 and is used to move bales onto, off of and along the latter during operation. Conveyor 74 has a pair of continuous, flexible chain elements 76 carried by opposite beams 68, and each element 76 has an uppermost stretch 76a that moves along the upper surface 68a of the corresponding beam 68 for engagement with bales carried by the bed 20. Preferably, each stretch 76a is confined within a longitudinal channel 78 (FIG. 11) defined between a pair of upwardly projecting members 80 and 82 that extend the full length of each beam 68. Each member 82, along the laterally inner side of its beam 68 is of circular or other suitable cross section that presents an arcuate exposed periphery, and the uppermost extent of such periphery is substantially at the same level as the top of stretch 76a.

Each beam tip 70 is in the nature of a pair of elongated, laterally spaced-apart ears 86 projecting outwardly beyond the proximal end of the remaining portion of the beam 68. Ears 86 carry a transverse stub shaft 88 in the nature of a bolt and nut assembly which rotatably supports an element guide in the nature of a toothed sprocket 90 about which the element 76 is looped. Each beam 68 is preferably hollow to provide clearance for the lowermost return stretch 76b of element 76.

Conveyor 74 may be powered in a number of different ways, each of which maintains the mouths 72 between beam tips 70 totally unobstructed. One arrangement is illustrated in FIGS. 1-6 (detailed in FIG. 6) wherein a drive shaft 92 spans the beams 68 substantially below and between the stub shafts 88 of sprockets 90 at opposite ends 21 and 23 of bed 20. As illustrated in FIG. 1, shaft 92 is disposed relatively near the wheel and axle unit 2 such that shaft 92 is far removed from ends 21 and 23 of bed 20. The low position of shaft 92 relative to the end sprockets 90 assures that shaft 92 cannot interfere with bales carried by beams 68 as illustrated in FIG. 5.

In the arrangement detailed in FIG. 6, the shaft 92 has a pair of drive sprockets 94 (one only being illustrated) fixed to its opposite extremities for driving engagement with the lowermost stretches 76b of the elements 76. Each beam 68 carries a pair of idler sprockets 96 and 98 above and in the same plane as the corresponding drive sprocket 94, each pair of idler sprockets 96 and 98 being disposed on opposite sides of the shaft 92. Each lower stretch 76b is looped under its drive sprocket 94 and over its two idler sprockets 96 and 98, and this configuration enables the lower stretches 76b to be returned fairly close to the upper stretches 76a, this being particularly beneficial where the angle of inclination of bed 20 is relatively small during pickup and unloading such that stretches 76 would otherwise drag along the ground adjacent the tips 70. Ths position of each idler sprocket 98 may be adjusted through a shiftable mount 100 in order to vary the tension on elements 76.

A suitable reversible prime mover 102 may take the form of a hydraulic motor, and prime mover 102 is operably coupled with shaft 92 through a chain and sprocket assembly 104. Prime mover 102, of course, my be situated below either of the beams 68.

Figure 7:
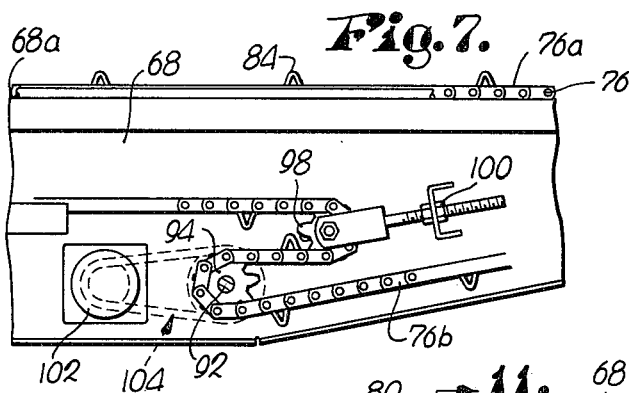
FIG. 7 is a fragmentary, cross-sectional view similar to FIG. 6 but showing a second drive arrangement.

In an alternative arrangement illustrated in FIG. 7, the idler sprockets 96 are removed and each lower stretch 76b utilizes only the single adjustable idler sprocket 98. Stretch 76b is looped in one direction about idler sprocket 98 and in the opposite direction about drive sprocket 94 in a doubling-back effect. While elimination of the sprockets 96 is desirable from a cost standpoint, this arrangement places those portions of stretch 76b leading from rear end sprockets 90 substantially further below upper stretches 76a than in the previous arrangement. Hence, this configuration is preferred only in situations where the angle of inclination of bed 20 during pickup and unloading is relatively steep such that stretches 76b will not drag along the ground during operation.

Figure 8:
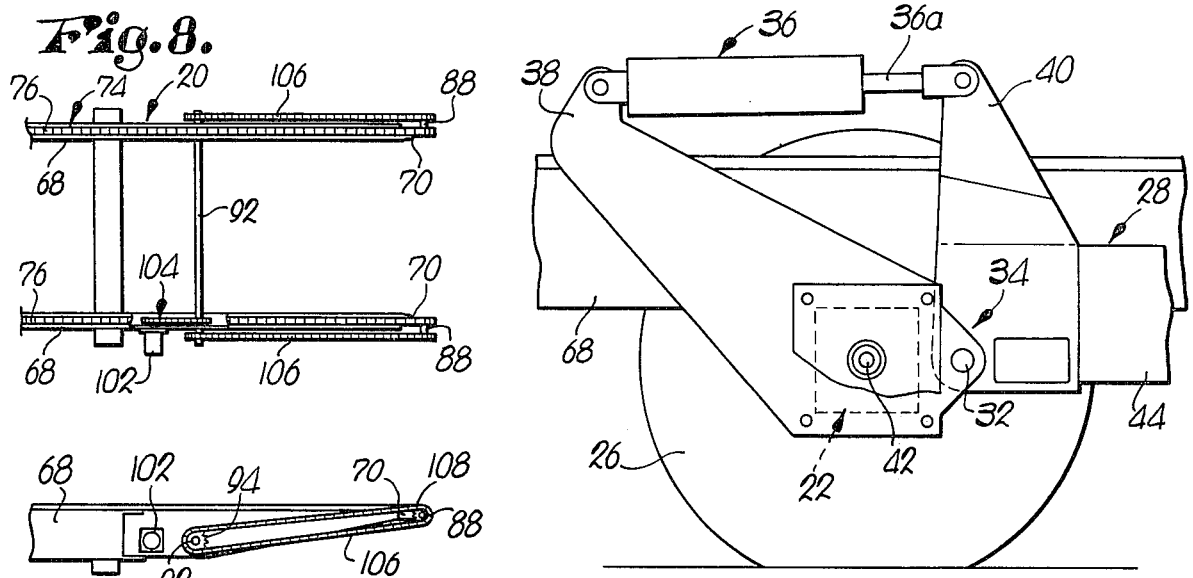
FIGS. 8 and 9 are fragmentary plan and elevational views respectively on a reduced scale of the rear end of the implement illustrating a third drive arrangement.
Figure 9:
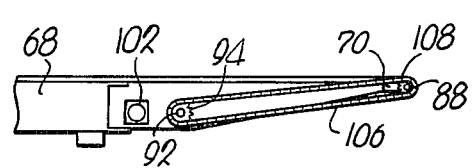

Another alternative arrangement illustrated in FIGS. 8 and 9 extends the drive shaft 92 slightly outwardly beyond the beams 68 and avoids direct engagement between shaft 92 and the lower stretches 76b. Instead, the drive sprockets 94 on shaft 92 are located outboard of beams 68 on the extensions of shaft 92 and are each drivingly coupled with the corresponding stub shaft 88 on tip 70 through an endless chain 106 and a sprocket 108 fixed to the extended outermost end of the stub shaft 88. As in the arrangement of FIG. 7, this configuration is only desirable where the angle of inclination of bed 20 during pick-up and unloading, is steep enough that chains 106 clear the ground during operation. Note the common feature in all three configurations of having the drive shaft 92 remote from ends 21, 23 and the top surfaces 68a of beams 68. In the arrangement of FIGS. 1–6, shaft 92 is even disposed below the structural crosspieces 110 that span the bottoms of beams 68 on opposite sides of wheel and axle unit 22 to rigidify bed 20.

Figure 10:
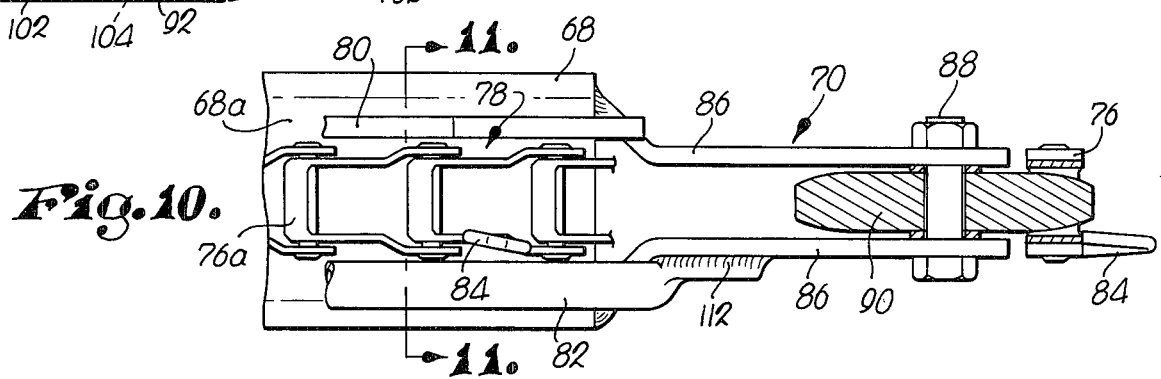
FIG. 10 is an enlarged detail view of the tip of a support beam illustrating its streamlined configuration.

Each tip 70 is streamlined in a manner to avoid any tendency to snag twine or the like that might be wrapped around bales being handled. In this regard, the ears 86 are displaced inwardly from opposite lateral sides of the corresponding beam 68 to such an extent that the transverse width of each tip 70 is substantially the same as or less than the transverse width of the corresponding element 76. As the elements 76 move around the end sprocket 90 as illustrated in FIG. 10, then, they completely cover tips 70 such that engagement with a bale being handled is made solely by the elements 76 and their lugs 84. Moreover, the proximal ends of the channel defining members 80, 82 are downturned as may be seen viewing FIGS. 2 and 6, while at the same time being blended smoothly into the tips 70 through fillet welds where possible such as illustrated by the numeral 112 in FIG. 10.

OPERATION

During movement to and from the field, the bed 20 is preferably located directly behind vehicle 30 as illustrated in FIG. 1. This minimizes interference with narrow gates and the like and facilitates towing.

If a bale to be picked up is situated in such a location as to make front loading impossible or dangerous, then bed 20 may be maintained in alignment with vehicle 30 and simply backed toward the bale as illustrated in FIG. 3. By extending ram 36a of piston and cylinder assembly 36, the bed 20 may be tilted downwardly and rearwardly about axis 42 until skids 114 on beams 68, adjacent tips 70 engage the ground. The bale is approached endwise with its longitudinal axis centered between beams 68 and as bed 20 continues to be backed up toward the bale, the latter is received within rear mouth 72 and engaged by conveyor elements 76. Forward actuation of the top stretches 76a of elements 76, coupled with the simultaneous continued rearward movement of bed 20, causes the bale to be progressively drawn up onto beams 68. Once the bale has become fully supported by beams 68, piston and cylinder assembly 36 may be retracted to reestablish a level condition for bed 20 whereupon the operator may transport the bale to a remote location or move on to the next bale and repeat the above procedure.

If the next bale to be picked up also requires rear loading, then the first bale is maintained at rear end 23 to abut the next bale as it is being loaded. On the other hand, if the next bale permits from loading, which is normally considerably easier for the operator, then the first bale is moved along bed 20 to the front end 21 thereof by conveyor 74 and maintained in that position as the front loading process is commenced. The piston and cylinder assembly 50 is then retracted to offset bed 20 to the left side of vehicle 30, viewing FIG. 1, so that the front mouth 72 is unobstructed as the next bale is approached. Retracting piston and cylinder assembly 36 then causes the front end 21 of bed 20 to swing to the ground until skids 114 engage the latter, whereupon continued advancement of the bed, coupled with rearward movement of the conveyor 74, causes the bale to be drawn up onto beams 68 in the manner illustrated in FIG. 4. Bed 20 may then be leveled up and the loaded bales transported to a remote location, or the operator may simply advance to the next bale with the bed still inclined or slightly elevated, whereupon the front loading procedure is repeated.

In unloading bales from the implement, it is necessary only to tilt bed 20 in the desired direction and then actuate conveyor 74 in the direction of downward tilt to drive the bales off the beams 68. Simultaneous movement of bed 20 in the direction opposite to conveyor movement, enables the beams 68 to be rapidly and easily drawn out from underneath the bales as they are deposited on the ground or other supporting surface.

Of substantial significance is the ease with which the implement of the present invention may be loaded and unloaded from either end thereof, a highly desirable feature in view of the fact that many situations permit loading only from the rear and not the front, or vice versa. By eliminating the existence of any drive shaft between end sprockets 90 at tips 70, the mouths 72 are rendered fully open and unobstructed to preclude any interference with bales as they are moved onto and off of ends 21, 23. The opposed tips 70 which define mouths 72 can move cleanly along opposite sides of a bale during pickup so as to assure that the bed 20 can be driven well under the bale at the initial part of the loading process. Further, such bales have an inherent tendency to sag downwardly between beams 68 while supported on the latter as illustrated in FIG. 5, and the lowered position of drive shaft 92 precludes any possibility of shaft 92 interfering with such sagging portion at this time.

Similarly, the streamlined nature of tips 70 facilitates the loading and unloading process by eliminating any tendency for binding twine about the bales to be snagged by tips 70. Thus, rapid, free and well controlled movement of the bales along beams 68 is assured. In this respect, confining the major part of the chain elements 76 within channel 78 and allowing only the lugs 84 to project beyond the upper arcuate periphery of members 82 assures that binding twine wrapped around the bales bears on members 82 instead of on sharp edges of elements 76. Hence, there is no accidental cutting of the twine as the bales are jostled up and down on bed 20 during transport over uneven terrain.

Also noteworthy is the fact that the axis 42 of swinging movement of the bed 29 is maintained relatively close to the ground by virtue of the rigid mounting of bed 20 on wheel and axle unit 22 and eccentrically disposed joint 34 between tongue 28 and wheel and axle unit 22. Thus, the degree of inclination of bed 20 during loading and unloading is reduced to an extent that facilitates both procedures. In this regard it has been found that if the bed 20 is inclined too steeply during loading, the bales will simply tip over backwards rather than travel up beams 68 as the latter are driven beneath the bales. Where bales are from 5 to 5½ feet in length, the maximum angle of bed inclination is approximately 15°. 11° has proven to be a preferred figure.

Having thus described the invention, what is claimed as new and desired to be secured by Letters Patent is:

1. In a transporting implement for cylindrical crop bales:
   an elongated, normally horizontal support bed including a pair of laterally spaced beams extending longitudinally between opposite ends of the bed and terminating in outermost tips;
   a continuous, flexible conveying element having an uppermost stretch extending along the top surface of each of said beams respectively;
   means for selectively tilting the bed in either of two opposite directions about a transverse, horizontal axis to place a selected end of the bed close to the ground for loading;
   a transverse stub shaft at each of the four tips of the beams, respectively,
   the two stub shafts at each end of the bed being axially aligned but physically spaced apart in accordance with the distance between the two beams;
   a guide associated with each stub shaft, respectively, and supported for rotation about the axis of the stub shaft to entrain the corresponding element; and
   reversible means for driving said elements in unison along the bed in either of two opposite directions,
   said bed at both of its opposite ends being devoid of structure spanning the beams whereby to define unobstructed areas from the tips inwardly that permit the beams to straddle a bale during endwise loading of the same from either end of the bed.

2. In a transporting implement as claimed in claim 1, wherein said driving means includes a transverse shaft spanning the beams and disposed below and between said axes of the stub shafts.

3. In a transporting implement as claimed in claim 2, wherein said drive means further includes a prime mover operably coupled with said transverse shaft for rotating the latter, and a pair of drivers fixed to opposite extremities of the shaft, each element having a lowermost stretch looped around a corresponding one of said drivers.

4. In a transporting implement as claimed in claim 3, wherein said drive means further includes a pair of rotatable idlers on each beam disposed above and on opposite sides of said transverse shaft in a common plane with the corresponding driver, said lowermost stretch of each element being looped under its driver and over its idlers.

5. In a transporting implement as claimed in claim 3, wheren said drive means further includes a rotatable idler on each beam disposed above and to one side of said transverse shaft in a common plane with the corresponding driver, said lowermost stretch of each element being looped in opposite directions about its idler and its driver.

6. In a transporting implement as claimed in claim 2, wherein said drive means further includes a prime mover operably coupled with said transverse shaft for rotating the latter, a first pair of drivers fixed to opposite extremities of the transverse shaft, a second pair of drivers fixed to a pair of said stub shafts at the same end of the bed, and a pair of endless, flexible drive members each entrained around a driver of said first pair and a driver of said second pair for transmitting power from the prime mover to the stub shafts.

7. In a transporting implement as claimed in claim 1, wherein each of said tips has a transverse width substantially equal to or less than the transverse width of its conveying element.

8. In a transporting implement as claimed in claim 7, wherein the top surface of each beam is provided with a guide channel receiving the uppermost stretch of its element, said elements each having a series of upstanding lugs thereon rising above said channel.

9. In a transporting implement as claimed in claim 8, wherein each element is provided with upwardly projecting, relatively sharp edges, each channel having an inner and an outer side with respect to the longitudinal axis of the bed, said inner side having an uppermost, arcuate periphery disposed substantially at or above the level of said edges.

10. An implement for loading, transporting, and unloading crop bales comprising:
    a mobile, normally horizontal support bed swingable intermediate its front and rear ends about an axis transverse to the normal path of travel of the implement,
    said bed being swingable between a downwardly and forwardly inclined position at one extreme and a downwardly and rearwardly inclined position at the other extreme for loading and unloading bales from either end;
    means for controlling said swinging of the bed and for holding the latter in a selected disposition at or between said extreme positions;
    a tongue coupled with the bed for attaching the latter to a towing vehicle,
    said tongue being disposed alongside the bed to clear the latter during its up and down swinging movement and including a section swingable laterally relative to the bed for selective positioning of the bed either directly behind the vehicle or offset to one side thereof;
    means for controlling said relative lateral swinging between the tongue section and the bed and for holding the same in selected relative positions;
    a conveyor on the bed extending between said front and rear ends thereof; and
    means for driving said conveyor in either of two opposite directions along the bed for drawing bales successively up onto a selected, lowered end of the bed during loading and driving bales successively down off of a selected lowered end of the bed during unloading,
    said tongue further including a stationary section held against lateral movement relative to the bed, said stationary section extending forwardly from said axis of swinging movement of the bed and being pivotally coupled at its forwardmost end with said swingable section,
    said control means for the swingable section including a fluid pressure piston and cylinder assembly operably coupled between the stationary and swingable sections.

11. An implement as claimed in claim 10, wherein said control means for the swingable section further includes a releasable lock between the two sections.

12. An implement for loading, transporting, an unloading crop bales comprising:
 a mobile, normally horizontal support bed swingable intermediate its front and rear ends about an axis transverse to the normal path of travel of the implement,
 said bed being swingable between a downwardly and forwardly inclined position at one extreme and a downwardly and rearwardly inclined position at the other extreme for loading and unloading bales from either end;
 means for controlling said swinging of the bed and for holding the latter in a selected disposition at or between said extreme positions;
 a tongue coupled with the bed for attaching the latter to a towing vehicle,
 said tongue being disposed alongside the bed to clear the latter during its up and down swinging movement and including a section swingable laterally relative to the bed for selective positioning of the bed either directly behind the vehicle or offset to one side thereof;
 means for controlling said relative lateral swinging between the tongue section and the bed and for holding the same in selected relative positions;
 a conveyor on the bed extending between said front and rear ends thereof; and
 means for driving said conveyor in either of two opposite directions along the bed for drawing bales successively up onto a selected, lowered end of the bed during loading and driving bales successively down off of a selected lowered end of the bed during unloading,
 said bed being provided with a wheel and axle unit including a pair of ground wheels on opposite sides of the bed and rotatable with respect to the latter, said bed being rigidly affixed to said unit and said axis of swinging movement of the bed coinciding with the axes of rotation of said wheels.

13. An implement as claimed in claim 12, wherein is provided a joint between the tongue and said unit disposed eccentrically with respect to said axes of the wheels and the bed, said joint buckling vertically during swinging of the bed between said extreme positions thereof.

14. An implement as claimed in claim 13, wherein said swing controlling and holding means for the bed includes a fluid pressure piston and cylinder assembly between said unit and the tongue.

15. A method of picking up readily accessible bales of crop materials scattered at random throughout a field and bales of lesser accessibility disposed along fence rows or other obstructions, and relocating the same in storage areas including those having buildings or other structures thereon, said method comprising the steps of:
 tilting an elongated, mobile bed about an essentially horizontal axis traversing the bed until the normally forwardmost end of the bed is closely adjacent the ground;
 loading one or more of said readily accessible bales end-wise in single-file order up and onto the inclined bed from said forwardmost end;
 leveling the bed to a generally horizontal position;
 tilting the bed about said axis until the normally rearmost end of the bed is closely adjacent the ground;
 loading one or more of said bales of lesser accessibility endwise in single-file order up and onto the inclined bed from said rearmost end;
 leveling the bed to said horizontal position;
 transporting the bed with the bales thereon to a preselected one of said areas; and
 unloading the bales from either of said ends or optionally, only from said rearmost end when the bales are to be located adjacent one of said structures.

16. The method as set forth in claim 15, moving the bed forwardly while loading, from said forwardmost end; and moving the bed rearwardly while loading from said rearmost end.

17. The method as set forth in claim 16, wherein said bales are cylindrical, straddling each bale being loaded as the bed is moved during loading until the bale being loaded is engaged on opposite sides of its cylindrical surface by a pair of spaced conveyors extending longitudinally of the bed throughout the length of the latter, the distance between the conveyors being less than the diameter of the bale, the bed being open and unobstructed between the conveyors at both of said ends of the bed so that the loading step includes the further step of avoiding engagement of the bale being loaded with any structure between the conveyors throughout the loading action; and actuating the conveyors during loading to move the bales in end-to-end relationship longitudinally of the bed.

18. The method as set forth in claim 15, placing the bed in tow behind a tractor with the longitudinal axis of the bed substantially parallel to the normal path of travel of the tractor; advancing the tractor to move the bed forwardly while loading from said forwardmost end; and reversing the tractor to move the bed rearwardly while loading from said rearmost end.

* * * * *